Figure 1:
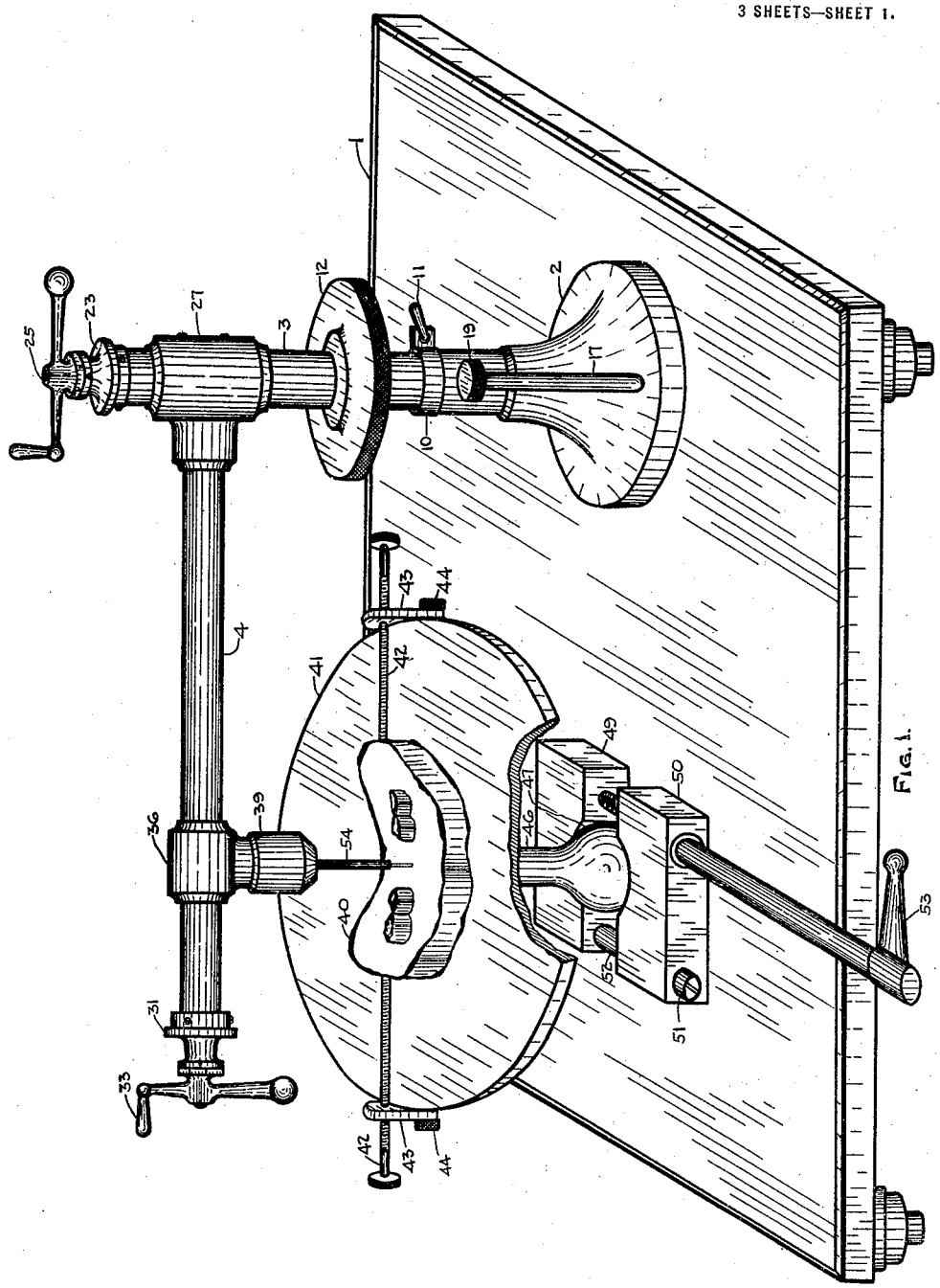

M. COHEN.
DENTAL INSTRUMENT.
APPLICATION FILED APR. 3, 1920.

1,400,028.

Patented Dec. 13, 1921.
3 SHEETS—SHEET 1.

Witnesses

Inventor
Milton Cohen
by Nathan I. Adler
his Attorney

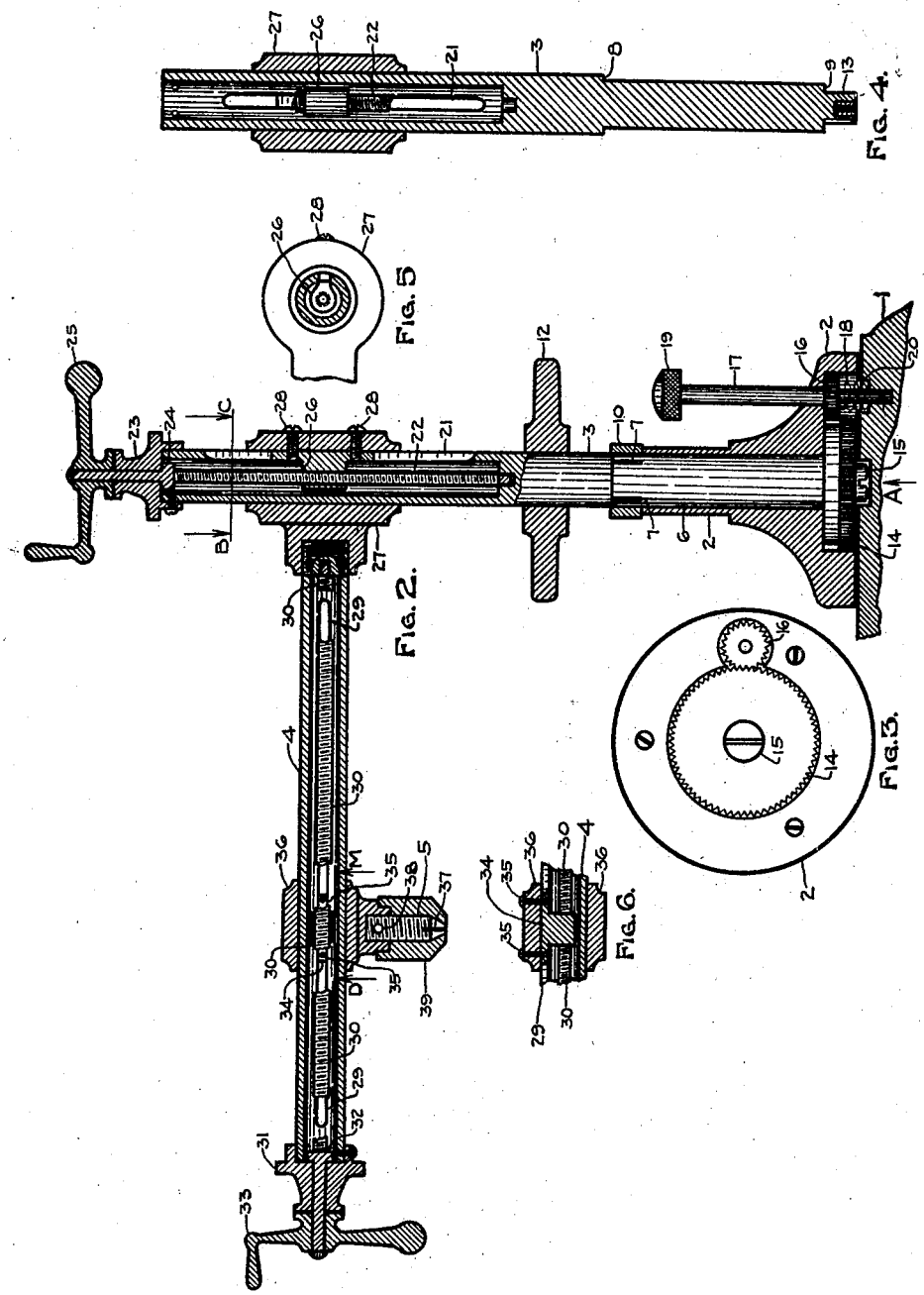

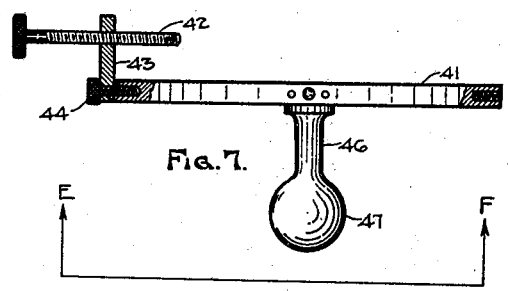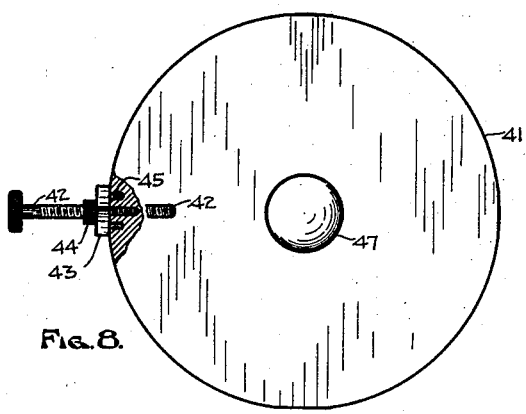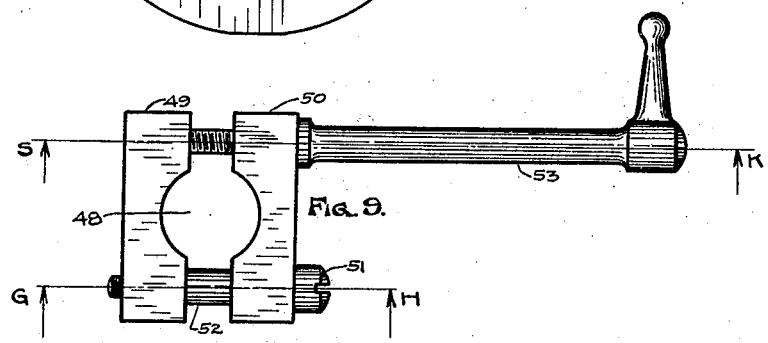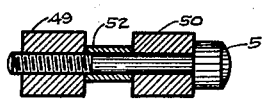

UNITED STATES PATENT OFFICE.

MILTON COHEN, OF NEW YORK, N. Y.

DENTAL INSTRUMENT.

1,400,028.

Specification of Letters Patent. Patented Dec. 13, 1921.

Application filed April 3, 1920. Serial No. 371,122.

*To all whom it may concern:*

Be it known that I, MILTON COHEN, a citizen of the United States, and a resident of New York city, in the county of New York and State of New York, have invented certain new and useful Improvements in Dental Instruments, of which the following is a full, clear, and exact specification, reference being had to the accompanying drawings, forming a part of this specification.

My invention relates to improvements in dental instruments and particularly to that class of dental apparatus known as "parallelometers." This instrument as hereinafter described and illustrated, is used principally in the preparation and installation of dental bridges, both fixed and removable and hereinafter termed a "parallelogage." When I refer to "dental bridges," in this specification, I use the term as it is commonly understood in the dental profession, *i. e.*, a dental bridge is one or more artificial teeth supported to one or more natural teeth, the latter being generally termed the "abutments," used to fill up edentulous spaces.

The main object of my invention has been the production of such an instrument, so as to enable the supporting attachments on dental bridges, and the abutments in the mouth to which these attachments are affixed, to be alined in practically perfect parallelism. This same degree of perfection is attained in the paralleling of the supporting attachments of the bridge, and also in the paralleling of one abutment with another. The attainment of these objects is due to the mechanism of my parallelogage functioning almost entirely through gearing or screw parts, thereby obviating the crude manhandling and fixing of the working parts, and producing a more flexible and finer adjustment than is otherwise attainable.

I also wish to set forth that this apparatus has been so contrived that all parts are well balanced, and the action of the working parts is positive in every instance. Another feature of my invention is the simplicity of its construction, operation, and adjustment.

Other objects will appear in the description following, and in the accompanying drawings wherein I have illustrated a practical embodiment of the invention, and wherein similar reference characters indicate corresponding parts in the various views.

In the accompanying drawings:

Figure 1 is a perspective view of my apparatus with a portion of the table cut off, showing more clearly the method for its support.

Fig. 2. is a sectional view partially through the standard, through the arm and through the chuck.

Fig. 3 is a view of the gearing arrangement recessed in the standard support, viewing it in the direction of arrow A, Fig. 2.

Fig. 4. is a sectional elevation of the standard, also showing a portion of the screw, bracket carrier, and the arm bracket.

Fig. 5. is a sectional plan view in the direction of the arrows B—C, in Fig. 2.

Fig. 6, is a partially sectional view taken in the direction of the arrows D—M, Fig. 2.

Fig. 7. is an elevation of the table arrangement.

Fig. 8. is a view of the table arrangement, taken in the direction of the arrows E—F, Fig. 7.

Fig. 9 is a plan view of the assembly of the pieces forming the socket arrangement.

Fig. 10. is a sectional elevation in the direction of the arrows G—H, in Fig. 9.

Fig. 11. is a sectional elevation in the direction of the arrows S—K, in Fig. 9.

This apparatus, referring to Fig. 1, consists of a bed plate 1, on which I show mounted, as far to its right extremity as practicable, and midway across, a standard support 2. This support 2 carries a rotatable standard 3 on which is disposed at right angles thereto, a vertically slidable arm 4. This arm 4 carries the horizontally movable chuck 5.

Now referring to Fig. 2, there will be seen the construction of the standard, arm, and chuck arrangement. The center of the standard support 2 is hollowed out to receive the thin sleeve 6, protruding somewhat above the top of the support as shown. On this projecting portion of 6, above the top of the support and at equal distances about its circumference, are provided three vertical slits, two of which are shown by 7, in Fig. 2.

The sleeve 6 has journaled in it that portion of the standard between the shoulders 8 and 9, shown in Fig. 4. About that portion of sleeve 6 protruding above the top of the support 2 is fixed a slit tightening band 10. The object of this band 10 is to prevent the standard 3 from rotating, when it is so desired. This locking effect on the standard 3 is accomplished through tensioning the band 10, by means of the thumb handle 11. This will be more clearly perceived by reference to Fig. 1. Of course the number of slits 7 in the sleeve 6, is arbitrary.

Again referring to Fig. 1, I show a circular turning piece 12, which is used to obtain a coarse adjustment in the rotation of the standard 3. This turning piece 12 is placed in position above the standard 3, at a convenient height, preferably at just a distance above the band 10, so as not to interfere with the movement of the thumb handle 11. A sectional view of the turning piece 12 is shown in Fig. 2. The fine adjustment in the movement of the standard 3 is accomplished through the gear arrangement shown in plan view in Fig. 3 and in elevation in Fig. 2. To the hub 13 forming the lower end of the standard 3 is pinned the gear wheel 14, the gear being held to the hub by the screw 15. The bottom of the support 2 is recessed to receive the gear. This gear wheel 14 has its teeth extending over one half of the face or thickness of the wheel, the blank portion being of somewhat smaller diameter than the toothed part. Moving in an adjacently recessed section at the bottom of the support 2 is a pinion wheel 16, forced against the shoulder of the shaft 17. A portion of the shaft 17 above 16 journals in the support 2 while a portion of 17 below the pinion 16 journals in the bed plate 1. The height of the recess in the support 2 for the pinion 16 is the same as the height of the recess for the gear 14. When the pinion 16, the thickness of which is just little less than one half the thickness of the gear 14, is not in use, it is held by the tension of the coil spring 18 against the upper surface of its recess in the support 2, and therefore is out of mesh with gear 14. To operate the gearing arrangement, the upper extremity of the shaft 17, which terminates in the knob 19, is pressed downward thereby engaging the pinion 16 with the toothed part of the gear wheel 14. When the pinion 16 is properly engaging the gear 14, the spring 18 is forced into the recess 20 provided for it in the bed plate 1. It will be seen that the horizontal swing of the arm 4 may be roughly adjusted by the employment of the turning piece 12 and the finer adjustment being obtained by use of the knob 19, the fineness of the adjustment in this latter case depending on the ratio of the gear and the pinion.

Referring to Fig. 2 and Fig. 4, it will be perceived that the upper part of the standard 3 is of hollow construction and that the wall of this hollow section of 3 is provided with a longitudinal slot 21. Disposed through the entire length of this hollow portion of 3 is a screw 22, terminating at its lower extremity into a hub, journaled in the solid part of the standard 3, and having its upper extremity journaled through the center of the cover piece 23, this latter acting as a cover piece for the hollow of the standard 3. That portion of 22 just above the termination of the threads is shouldered, this shoulder 24 backing against the inner surface of 23, thereby preventing any up or down movement of the screw 22. The upper end of 22 is provided with the hand wheel 25, this being the means for turning or actuating the screw, the movement of course being only in the horizontal plane.

The purpose of the slot 21 in the hollow wall section of the standard 3 is to provide a travel-way for the bracket carrier 26, shown in the sectional side elevation in Fig. 2, in front elevation in Fig. 4 and in plan view in Fig. 5. The extension to the portion of this bracket carrier 26 riding in the slot 21, is hollow throughout its length, this hollow part being threaded to receive the screw 22. This will more plainly be seen by reference to Fig. 5. To this bracket carrier 26 is joined the T arm bracket 27, in this case by the screws 28, this bracket 27 carrying the arm 4. By turning the hand wheel 25 in an either clockwise or counter-clockwise direction the arm bracket 27 will be caused to move in either an upward or downward direction, giving to the arm 4 an up or down motion. From this arrangement it is obvious that a very fine vertical adjustment can be obtained in the movement of the arm 4.

The arm 4, referring to Fig. 2, is screwed into the T bracket 27 and is therefore positioned at right angles to the standard 3. This arm is hollow throughout its length except for the portion occupied by the threads, the wall of the hollow portion being provided with the slot 29, similar to and used for the same purpose as the slot 21. Disposed throughout the entire length of the hollow section of the arm 4 is the screw 30, having its right extremity terminating in a hub, journaling in the solid portion of 4, and with its left extremity journaling in the cover piece 31, this being the cover piece for the hollow of the arm. The screw 30 is provided with the shoulder 32 positioned against the inner surface of the cover piece 31, thus preventing any right or left side movement of the screw. To the left terminus of the screw 31 is fixed the hand wheel 33, providing the turning effect for the screw. It will be quite readily seen that the screw 30 is similar in its construction and operation to the screw 22. There is likewise provided for this slot 29 a bracket carrier 34 also similar in construction and operation to the bracket carrier 26, described hereinbefore. To the carrier 34 is joined, by means of the screws 35, the T chuck bracket 36, also similar in construction and operation to the T bracket 27, described above. The arm of the bracket 36 is internally threaded and receives the threaded chuck 5. The chuck 5 is held in position in the arm of the bracket 36 by the set screw 38, and has provided in its lower position, in this instance, three slots 37. The internally threaded piece 39 being used as the tensioning agent, for say, a mandrel 54 to be used in the chuck. Again it can be obviously concluded with reference to this arrangement, that the horizontal movement of the chuck along the arm 4, actuated by the rotation of the hand wheel 35, can be controlled to almost any desired degree of fineness.

The dental bridge 40 referring to Fig. 1, which let it be assumed is to have attachments provided, is placed on the table 41, and clamped in the desired position by the clamp screws 42. In Fig. 1, Fig. 7 and Fig. 8, I have made provision for attaching four holding clamps 43, to the table 41, but this number of holding clamps may be changed to suit the requirements. The clamps 43 are held against the edge of the table by the set screws 44. Those sections of the edge of the table against which the clamps 43 are positioned, are flattened to give the proper supporting surface for the clamp. I have shown each of these clamps 43 provided with two pin projections 45, recessing in the table shown in Fig. 8, for the purpose of preventing the occurrence of any oscillating motion during the operation of the screw 42.

The table 41 is supported in the socket arrangement shown in Fig. 9 through the shaft 46, which in turn terminates in the ball 47, held in its receptacle 48 in the socket arrangement. This socket arrangement shown in Fig. 9 is made up of the two socket pieces 49 and 50, forming the socket 48, these pieces 49 and 50 being held in position by the bolt 51 and spacer 52. The ball 47 is clamped in its socket 48 by the turning movement of the lever 53 in the proper direction. This lever 53 is threaded through a part of its length, this threaded portion operating in the tapped hole in the socket piece 49, referring to Fig. 11. The socket piece 50 alone is fixed to the bed plate 1, by means of screws, which permits the piece 49 to move when the lever 53 is turned, releasing the ball, and therefore permitting the table to be moved when so desired. It will be noted that by this ball and socket arrangement, the table 41 and the dental bridge clamped thereon, may be tilted to any angle desired, and securely held there.

The bed plate 1, I show provided with four feet which may be adjustable allowing the bed plate to be tilted, to compensate for a tilt of the supporting structure upon which it is set, provided of course, this tilt is not too marked.

The periphery of that edge of the hand wheels 25 and 33, in contact with the cover pieces 23 and 31, respectively, I have shown graduated into arbitrary divisions, should it be desired to ascertain the amount of vertical movement of the arm 4, or horizontal movement of the chuck 5, respectively.

The chuck 5 may be made to hold practically any type of mandrel, used by the dental profession, or in fact any of the appliances required to accurately position a dental bridge in the mouth.

The design of the various parts of the apparatus required to successfully carry out the objects and purposes of my invention, have been shown in as clear and simple a manner as possible. However, I wish to call attention to the fact that the construction of these parts may be modified and yet successfully attain the purposes and objects hereinbefore cited for my invention.

What I claim is:—

1. In a dental parallelogage, the combination of a bed plate, of a standard support mounted thereon, of a geared standard member carried rotatably by said standard support, of a turning means for rotating said standard, of a horizontally revoluble arm member supported vertically slidable upon said standard member, of a chuck holding member carried horizontally slidable on said arm member, of a universally adjustable table member supported upon said bed plate, and adjustable legs for support of said bed plate.

2. In a dental parallelogage, the combination of a bed plate, of a standard support mounted thereon, of a slitted sleeve member, carried in this standard support, of a rotatable standard carried in this sleeve member, of gearing means for controlling movement of said standard, and a clamping means for holding the standard at rest, when so desired.

3. In a dental parallelogage, the combination of a bed plate, of a standard support, of a slitted sleeve member carried in said standard support, of a partially hollow slotted standard carried by said standard support, of a rider element vertically slidable in slot of standard, of a bracket rigidly attached to said rider element, said bracket carrying the arm member, and a chuck carried by said arm.

4. In a dental parallelogage, the combination of a bed plate, of a standard support carrying a partially hollow slotted standard, of a gear and pinion means for controlling movement of said standard, of a rider element vertically slidable in slot of standard, of a screw means for actuating said rider element, of an operating means for said screw, of a cover element for hollow end of slotted standard, and said cover element acting as journal means for said screw, of a vertically slidable bracket attached to said rider element, of a horizontally movable arm carried by said bracket, and chuck carried by said arm.

5. In a dental parallelogage, the combination of a bed plate, of a standard support carrying a partially hollow slotted standard, adjustable in a horizontal direction only, of a gear and pinion means for controlling movement of said standard, of a rider element in said standard, of a screw means for actuating said rider element, of a bracket fixed to said rider element, of a partially hollow slotted arm carried in said bracket, of a rider element slidable in slotted section of said arm, of a bracket member rigidly joined to said rider and movable along said arm, said bracket carrying the chuck, of a screw means for actuating said rider element, of a turning means for said screw element, and a cover element for end of said hollow arm, said cover element acting as journal means for said screw.

6. In a dental parallelogage, the combination of a bed plate, of a standard support mounted thereon, of a rotatable standard carried in said standard support, of an arm bracketed to said standard, said arm carrying the chuck, of a socket element mounted on said bed plate, said socket element carrying ball extension supporting a table adjustably positioned to any angle.

7. In a dental parallelogage, the combination of a bed plate, of a standard support mounted thereon, of a rotatable standard carried in said standard support, of an arm bracketed to said standard, of a horizontally movable chuck bracketed to said arm, of a socket element, said socket element supported to bed plate through one socket piece only as hereinbefore described, of a lever element for adjusting said socket, of a ball element supporting table and functioning in said socket so as to produce a universal movement for table, and clamping means, mounted on periphery of table for holding dental model in required position on table.

Dr. MILTON COHEN.

Witness:
H. W. KRUMWIEDE, Jr